No. 716,349.　　　　　　　F. H. RICHARDS.　　　Patented Dec. 16, 1902.
PLAYING BALL.
(No Model.)　　　　(Application filed Oct. 18, 1902.)
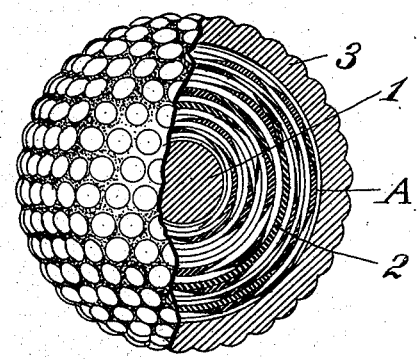
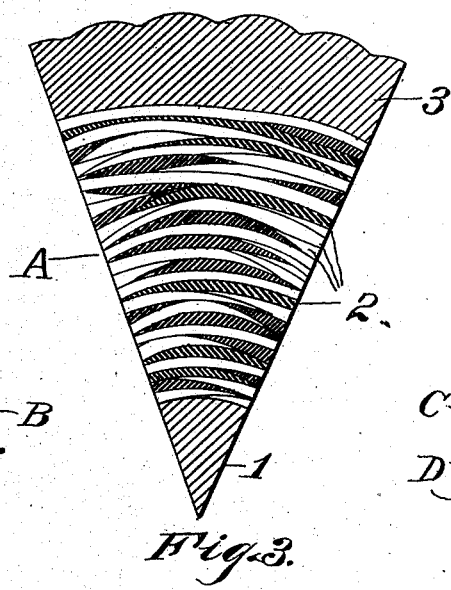
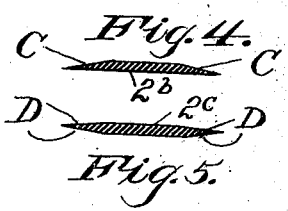
Witnesses:
John O. Seifert.
P. C. Stickney.
Inventor:
F. H. Richards.

UNITED STATES PATENT OFFICE.

FRANCIS H. RICHARDS, OF HARTFORD, CONNECTICUT, ASSIGNOR TO THE KEMPSHALL MANUFACTURING COMPANY, OF ARLINGTON, NEW JERSEY, A CORPORATION OF NEW JERSEY.

PLAYING-BALL.

SPECIFICATION forming part of Letters Patent No. 716,349, dated December 16, 1902.

Application filed October 18, 1902. Serial No. 127,823. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Playing-Balls, of which the following is a specification.

This invention relates to golf and other playing balls; and its object is to produce at low cost a ball having phenomenal flying power.

In the accompanying drawings, Figure 1 is a part-sectional view of one form of ball made in accordance with my present improvements. Fig. 2 is a cross-section of one form of rubber strip that may be used in winding the filling or body of the ball. Fig. 3 is a segmental section, on an enlarged scale, of the complete ball; and Figs. 4 and 5 are cross-sections of still other forms of rubber strips which may be used in carrying out my present invention.

Upon a center piece 1, which may be of hard material and is preferably springy, I wind sufficient rubber strip 2 to make a thick layer or sphere A, and upon such filling I apply a shell 3, of plastic material, preferably of gutta-percha and preferably holding the filling under compression.

The rubber strip 2, Fig. 2, which may be heat-cured, is beveled, chamfered, or thinned down at its sides or edges, as at B, and when in winding the ball the strip is drawn to a high tension, as is usual in making playing-balls, the body of the strip becomes materially thinned, so that the layers pack very close, while owing to the tapering off or thinning of the strips at their edges each winding is enabled to fit down close and tight upon prior windings, avoiding any crevices whatever and making an absolutely solid ball or sphere, all parts of which are under high tension. It will be seen that ordinary heat-cured rubber may be used of sufficient thickness to enable it to be subjected to a high degree of tension without liability of parting, and in this way a solid ball may be made of this kind of rubber, although my improvements may, if desired, be carried out with other suitable material.

I apprehend that when the ball is given a blow the only effect possible is a change of shape of the ball A from that of a true sphere, which change of shape necessarily stretches longitudinally the individual rubber layers of which the sphere consists. Since the tension of the rubber is such that its reaction is instantaneous, the ball flies from the club with phenomenal speed. Moreover, the great store of energy in the rubber cannot be brought into action except by means of a heavy blow, so that it is inactive under a light blow, and hence is a good "putter."

The cross-section at Fig. 2 illustrates a parallelogram, this being the preferred section of the beveled rubber strips, since it may be cut in this form direct from rubber sheeting by making a bias or a slanting cut with the knife. In Fig. 4, however, the strip $2^b$ is illustrated at $c$ as being beveled upon its upper side along both edges, while at Fig. 5 the strip $2^c$ is illustrated at D as beveled upon both upper and lower sides at each edge. Other forms of strips may be employed, so long as they are thinned at the edge to a sufficient extent to enable the ball to be wound solidly.

Other variations may be resorted to within the scope of my present improvements.

Having thus described my invention, I claim—

1. In a playing-ball, a sphere consisting of windings of tensioned sheet-rubber which is thinned along the edge, said windings forming a solid body.

2. In a playing-ball, the combination of a sphere consisting of windings of tensioned sheet-rubber which is thinned along the edge, said windings forming a solid body, and a cover.

3. In a playing-ball, the combination with a center piece of a sphere thereon consisting of windings of tensioned sheet-rubber which is thinned along the edge, said windings forming a solid body.

4. In a playing-ball, the combination with a center piece of a sphere thereon consisting of windings of tensioned sheet-rubber which is thinned along the edge, said windings forming a solid body, and a cover of plastic material.

5. In a playing-ball, the combination of a sphere consisting of windings of tensioned sheet-rubber which is thinned along the edge, said windings forming a solid body, and a shell of gutta-percha.

6. In a playing-ball, the combination of a sphere consisting of windings of tensioned sheet-rubber which is thinned along the edge, said windings forming a solid body, and a shell of gutta-percha holding said windings under compression.

7. In a playing-ball, the combination with a center piece of a sphere thereon consisting of windings of tensioned sheet-rubber which is thinned along the edge, said windings forming a solid body, and a shell of gutta-percha holding said windings under compression.

8. In a playing-ball, the combination with a center piece of a sphere thereon consisting of windings of tensioned sheet-rubber which is thinned along the edge, said windings forming a solid body, and a shell of gutta-percha holding said windings under compression.

9. In a playing-ball, the combination of a sphere consisting of windings of highly-tensioned heat-cured sheet-rubber, which is thinned along the edge.

10. In a playing-ball, the combination of a sphere consisting of windings of highly-tensioned heat-cured sheet-rubber which is thinned along the edge, and a cover formed of plastic material and holding said windings under compression.

11. In a playing-ball, the combination of a sphere consisting of windings of tensioned rubber strip, which is thinned along each edge, a cross-section of the strip resembling a parallelogram.

12. A rubber-strip thinned along its edges and wound upon itself to form a sphere.

Signed at Nos. 9 to 15 Murray street, New York, N. Y., this 17th day of October, 1902.

FRANCIS H. RICHARDS.

Witnesses:
B. C. STICKNEY,
JOHN O. SEIFERT.